(12) United States Patent
Ryan (10) Patent No.: US 8,774,467 B2
(45) Date of Patent: Jul. 8, 2014

(54) PREDICTIVE FLIGHT PATH AND NON-DESTRUCTIVE MARKING SYSTEM AND METHOD

(76) Inventor: Michael C. Ryan, Mitchellville, IA (US)

( * ) Notice: Subject to any disclaimer, the term of this patent is extended or adjusted under 35 U.S.C. 154(b) by 145 days.

(21) Appl. No.: 13/204,593

(22) Filed: Aug. 5, 2011

(65) Prior Publication Data

US 2012/0033855 A1 Feb. 9, 2012

Related U.S. Application Data

(60) Provisional application No. 61/371,025, filed on Aug. 5, 2010.

(51) Int. Cl.
*G06K 9/00* (2006.01)

(52) U.S. Cl.
USPC .......................................................... 382/107

(58) Field of Classification Search
None
See application file for complete search history.

(56) References Cited

U.S. PATENT DOCUMENTS

| | | | | |
|---|---|---|---|---|
| 4,042,236 | A * | 8/1977 | LePrevost | 473/474 |
| 5,798,833 | A * | 8/1998 | Onuki et al. | 356/256 |
| 5,938,545 | A * | 8/1999 | Cooper et al. | 473/407 |
| 2005/0012657 | A1* | 1/2005 | Mohan | 342/133 |
| 2007/0005540 | A1 | 1/2007 | Fadde | |
| 2007/0238539 | A1* | 10/2007 | Dawe et al. | 473/131 |
| 2008/0086223 | A1 | 4/2008 | Pagliarulo | |

FOREIGN PATENT DOCUMENTS

EP 0435910 3/1990

OTHER PUBLICATIONS

Fluid Mechanics, PowerView HS-3000 Camera Model 630064, TSI Incorporated, 2005, 2 pages.
Nathan, Alan M., "The effect of spin on the flight of a baseball," Department of Physics, University of Illinois 61801, Jun. 27, 2007, pp. 119-124.
API empowering metrology solutions, Automated Precision Inc., "The world leader in advanced metrology solutions, Video Camera Accessory for Tracker3," Undated, 1 page.
"Using Camera Technology to 'Measure' Golf Launch Parameters?", Undated, 8 pages.
"IMAGO-S Video Tracker Performance Specification," IMAGO Trackers, IMAGO Machine Vision, Inc., 2006, 2 pages.
Nowicki, Andrew W., "Forces that govern a baseball's flight path," Apr. 21, 1999, pp. 1-5.
"Curveball's sharp break is illusory, scientists say," Metro Edition, Des Moines Sunday Register, Undated, 1 page.
"Teleproduction Test, A Primer in the Use of Vectorscopes Part 3," vol. 1, No. 6, Undated, 4 pages.
"Ballistic Flight Equations," Glenn Research Center, Undated, Aug. 19, 2010, 4 pages.
Venit, Stewart, "Measuring Home Run Distance," National Curve Bank Baseball, 2004, 4 pages.
"Forces on a Baseball," Glenn Research Center, Aug. 18, 2010, 3 pages.

(Continued)

*Primary Examiner* — Atiba O Fitzpatrick
(74) *Attorney, Agent, or Firm* — Berry & Associates P.C.

(57) ABSTRACT

Systems and methods for acquiring and targeting an object placed in motion, tracking the object's movement, and while tracking, measuring the object's characteristics and marking the object with an external indicator until the object comes to rest is provided. The systems and methods include an acquisition and tracking system, a data capture system, and a marking control system. Through the components of the system, an object moving through two or three dimensional space can be externally marked to assist with improving the performance of striking the object.

24 Claims, 4 Drawing Sheets

(56) References Cited

OTHER PUBLICATIONS

"Index of Classic Plane Curves and Surfaces," National Curve Bank, Undated, 5 pages.
"Setting Up a Glenlocked Studio," Tektronix, Undated, 4 pages.
"Vision Processors, Matrox Radient eCL," Undated, 1 page.
Haby, Jeff, "Weather and Baseball Flight," Undated, 2 pages.
"xsquared Baseball," Tangient LLC, 2011, 2 pages.
Lecklider, Tom, "Identifying Frame Grabber Core Competencies," Dec. 2005, 7 pages.
Young, Josiah W., "Tracking a Baseball During a Color Naming Task," A Thesis, Presented in partial fulfillment of the requirements for the degree Master of Science in the graduate school of the Ohio State University, Graduate Program in Vision Science, The Ohio State University, 2009, pp. 1-31.
"The World's Most Accurate Large Volume Laser Tracker: FARO Laser Tracker Ion," Undated, 2 pages.
"FoxTrax", Wikipedia, last modified on Feb. 15, 2012, 4 pages.
"Gimbal Flexible Mount and Universal Pan, Tile and Roll!," AutoCopter, Oct. 20, 2011, 4 pages.
Dodd, Mike, "When it comes to hitting a baseball, the eyes have it," USA Today, Jun. 2, 2005, 4 pages.
"Looxcie Wear-and-Share Video Cams," Looxcie Store, Looxcie, Inc., 2011, 2 pages.
"Applying Science to the Art of Baseball," OnePitch Newsletters, Aug. 2010, 2 pages.
Harrison, Bill, Dr., "Only Players with Fit Eyes Survive," BaseballResource.com, Dec. 2006, 4 pages.
Reinstein, Dan Z., M.D., "The Oculign: Great Eye Registration for a High-Volume Practice," Cataract & Refractive Surgery Today, 2012, 2 pages.
Fast, Mike, "Can we classify every pitch?," May 21, 2010, 11 pages.
"InGaAs Products: Area Cameras," Goodrich, Undated, 6 pages.
"InGaAs SWIR Windowing Cameras, SU320KTSW-1,7RT, SU320KTSWVis-1.7RT," Goodrich, Undated 2 pages.
"Nokia N95 accelerometer in Blender," Jun. 12, 2009 by Bart, 8 pages.
"FARO Laser Tracker—YouTube," FaroEurope, Jul. 13, 2007, 2 pages.
"API Laser Tracker: T3, Active Target, and SmartTrack Sensor—YouTube," Automated Precision, Nov. 17, 2009, 2 pages.
Bors, Adrian, G., et al., "Prediction and Tracking of Moving Objects in Image Sequences," IEEE Transactions on Image Processing, vol. 9, No. 8, Aug. 2000, pp. 1441-1445.

* cited by examiner

PREDICTIVE FLIGHT PATH AND NON-DESTRUCTIVE MARKING SYSTEM AND METHOD

PRIORITY CLAIM

The present invention claims priority to and the benefit of U.S. Provisional Application No. 61/371,025 filed on Aug. 5, 2010, the contents of which are incorporated herein by reference.

BACKGROUND OF THE INVENTION

1. Field of the Invention

The present invention is generally related to tracking the motion of a moving object. More particularly, the present invention pertains to a system and method of tracking a moving object and externally marking the object in real time.

2. Introduction

To strike or focus on a moving object, many aspects regarding the object and its movement need to be assimilated and come together at the moment of impact. Depending on the application, the aspects involved may include the status of the object, the status of the striker or viewer (collectively, referred to as a striker herein), and external forces such as gravity, humidity, temperature, wind resistance and the like. The status of the object may include parameters such as the spin of the object, its weight, composition, and how the object was projected or released. The status of the striker may include whether the striker is a human or a machine, placement of the striker in relation to the moving object, whether another object is being used to strike the incoming object, and the mechanics of striking the object.

One set of activities that involve striking moving objects is in the area of sports. Sports such as baseball, softball, soccer, football, tennis and other racquet sports, hockey (ice or field) all involve a human player striking a projectile, e.g., a player swinging a bat at a baseball. Success in these sports is predicated upon the skill of the player to determine the movement path of the projectile given a combination of variables and then the ability to strike the projectile either with a hand, racquet, bat, foot, or some other instrument. Everyone from youth to adults, amateurs to professionals, and players and referees/umpires dedicate an enormous amount of practice to break down, learn, and practice the proper mechanics needed to become successful at their particular activity.

Depending on the application, some mechanics are more important or contribute to a player's success than others. For example, in the sport of baseball some of the aspects continually studied and practiced include foot placement (stance) of the batter at the plate, weight and balance application of the feet, hand placement (grip) of the bat, bat placement (hands high or low, maybe moving), swing mechanics of the hands, arms, hips and feet. However, the skill of watching the ball leave the pitcher's hand (or a pitching machine) and the skill involved in predetermining whether to attempt to hit the incoming ball (i.e., its hit-ability) in a fraction of a second is considered one of the most, if not the most, paramount skill of all. Without this skill of predicting the ball's flight path, all of the other mechanics that follow in the hitting the ball are limited in their impact.

Through the years, learning to strike objects has been practiced through "after the fact" instruction. After the fact instruction involves a player practicing the activity, such as kicking a ball, multiple times in front of a parent, coach, or camera, then receiving feedback on the performance after the activity. Instructions were given based on listening to a critique from the coach possibly in conjunction with viewing a video of the player's practice. Through the use of video, a coach or teacher, or any viewer for entertainment or recreational purposes can study a person's mechanics. Typically, a coach and/or player would identify weaknesses in one's mechanics as seen on the video and then receive instruction as to how to better one's performance. After the instructional session, a player would then repeat practice of the activity. To improve, a player needs to remember the instructions given in the after the fact instruction period. This type of after the fact instruction is limited to utilizing information only about the status of the striker, e.g., how a player was holding a bat or how close a player's foot was to the ball before kicking. Nothing regarding the incoming object is recorded other than possibly seeing the object on the video.

To compensate for this limitation of information, some systems attempt to supplement the learning process by providing information about the moving object after the activity. For example, a well known but simplified measurement is measuring the speed of a baseball pitch as determined by a radar apparatus. This information is collected and provided along with the after the fact instruction session. In the sport of baseball, such systems have evolved to be able to reveal almost everything about a particular pitch, such as its speed, movement, rotation, and where the ball crosses the plate. Many of these systems have been used to show a viewer the characteristics of the pitch to enhance the entertainment value of watching the game. Additionally, these systems have provided an opportunity for grading an umpire's ability to accurately call a pitch. However, these systems still provide after the fact analysis of a particular pitch. Even though more information is provided to a player regarding performance, the player must still stop the practice activity, assimilate the after the fact information and instruction, then restart the practice activity.

As stated above, one of the most important skills in striking an object is the striker's ability to recognize and then predict the path of the incoming object. The systems above rely on viewing the activity after it has happened. None of these systems enable one to practice predictive visual identification of the incoming object as it is happening. In the context of baseball, these systems do not aid a batter while standing in the box to identify the pitch before hitting the ball. What is needed is a system and method that predictively determines the path of an incoming object as the object approaches and signals to the striker or the viewer various information about the incoming object (in real time) to improve performance.

SUMMARY OF THE INVENTION

While the way in which the present invention addresses the disadvantages of the prior art will be discussed in greater detail below, in general, the present invention for systems and methods for predictively determining the path of an incoming object and signaling in real time to a striker various information about the incoming object. The systems and methods provide for tracking the motion of an object and marking the object as the object is moving.

A motion tracking and marking system includes an acquisition and tracking system, a data capture system, and a marking control system, and a communication network providing communication between these systems. The acquisition and tracking system may utilize a combination of sensing devices and software. The data capture system includes a processor and storage structure suitable to manipulate data acquired within the time frames required by specific applications and predict the object's trajectory. The marking control system includes hardware and/or software that is configured to mark the moving object as the object travels through its trajectory. In one embodiment, the marking control system comprises a laser.

A method of tracking a moving object and marking the object while moving comprises the steps of tracking an object in motion, calculating an anticipated trajectory of the object in motion, and marking the surface of the object in motion as the object travels through its actual trajectory. In various embodiments, the marking comprises a visual indicator.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are described in detail below. While specific implementations involving electronic mobile devices (e.g., portable computers) are described, it should be understood that the description here is merely illustrative and not intended to limit the scope of the various aspects of the invention. A person skilled in the relevant art will recognize that other components and configurations may be easily used or substituted than those that are described here without parting from the spirit and scope of the invention.

The present invention facilitates predictively determining the path of an incoming object and signaling in real time to a striker various information about the incoming object. In general, the invention provides a system and method for tracking the motion of an object and visually marking the object while in movement. In particular, the invention provides a system and method for acquiring and targeting an object placed in motion, tracking the object's movement, and while tracking, measuring the object's characteristics, predicting the object's path, and marking the object with an external indicator until the object comes to rest. Thus, as will become apparent from the following descriptions, the system and methods of the invention facilitate determining the movement of an incoming object, communicating that determination to a marking system, and marking the object so that the striker or viewer of the object may improve performance.

For the sake of brevity, conventional data networking, application development and other functional aspects of the systems (and components of the individual operating components of the systems) may not be described in detail. The connecting lines shown in the various figures are intended to represent exemplary functional relationships and/or physical couplings between various elements. It should be noted that many alternative or additional functional relationships or physical connections may be present in a practical system.

The invention may be described in terms of functional block components, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, audio and/or visual elements, input/output elements, wired or wireless communication techniques, and the like, which may carry out a variety of functions under the control of one or more microprocessors or other control devices.

Similarly, the software elements of the invention may be implemented with any programming, scripting language or web service protocols such as C, C++, C#, Java, COBOL, assembler, and the like. As those skilled in the art will appreciate, the software and hardware elements may be implemented with an operating system such as Microsoft Windows®, UNIX, Apple OS X, MacOS, Linux, and the like.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium have computer-readable program code means embodied in the storage medium. Any suitable computer-readable storage medium may be utilized, including hard disks, CD-ROM, optical storage devices, magnetic storage devices, and/or the like.

The computer program instructions may be loaded onto a general purpose computer, special purpose computer, or other programmable data processing apparatus to produce a machine, such that the instructions execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer-implemented process such that instructions which execute on the computer or other programmable apparatus provide steps for implementing the functions specified in the flowchart block or blocks.

Figure 1:
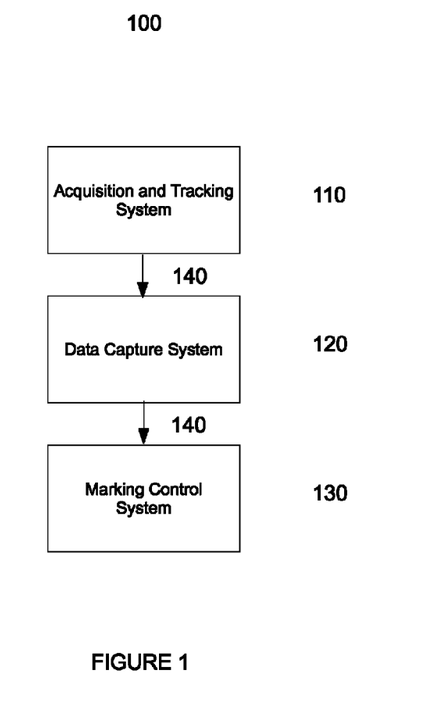
FIG. 1 illustrates an exemplary a motion tracking and marking system.

FIG. 1 illustrates, in block format, an exemplary motion tracking and marking system 100 of the invention. In one embodiment, a motion tracking and marking system comprises an acquisition and tracking system (ATS) 110, a data capture system (DCS) 120, and a marking control system (MCS) 130. Depending on the physical configuration, these systems may use a variety of methods to communicate with each other. For example, in some embodiments, the systems may communicate over one or more networks 140 using protocols suited to the particular system and communication. As used herein, the term "network" shall include any electronic communications means which incorporates both hardware and software components. Communication among the systems may be accomplished through any suitable communication channels, such as, for example, a telephone network, an extranet, an intranet, Internet, portable computer device, personal digital assistant, online communications, satellite communications, off-line communications, wireless communications, transponder communications, local area network, wide area network, networked or linked devices, keyboard, mouse and/or any suitable communication or data input modality. In other embodiments, the data capture system may be part of either the acquisition and tracking system or the marking control system such that they are mechanically and electrically coupled by a communications bus. In another embodiment, these systems are contained within a single physical unit and appropriately coupled through various integrated circuit components.

Acquisition and tracking system (ATS) 110 includes any hardware and/or software suitably configured to recognize an object put into motion and determine its position in three dimensions as may be needed for the particular application. In general, the acquisition and tracking system 110 is implemented as a combination of sensing devices and application software that are configured so that the ATS 110 can acquire an object at the beginning or close to the beginning of the object's movement. Once the object is acquired, the ATS 110 is also configured to track the object's movement within three dimensions. In various embodiments, the ATS 110 may utilize systems that employ visual, sound, or radar or other similar means to acquire and track objects. In some embodiments, the ATS 110 employs the use of one or more camera systems. In an exemplary embodiment, two camera systems are used, one situated along the x-y-axis and one situated along the z-axis of the path of intended movement of an object. Systems of tracking the movement of objects are well known in the art and will not be described in detail.

Data capture system (DCS) 120 includes any hardware and/or software suitably configured to capture relevant tracking data (e.g., an object's path or trajectory) from the acquisition and tracking system 110 and provide such data to the marking control system 130. Data captured may include the object's orientation, whether the orientation is changing relative to the object's movement, the object's position in a two or three dimensional space, and the object's speed. For example, in a three dimensional space, an object's vertical and horizontal velocity, height from the ground, distance traveled, and time in flight may be captured and recorded. Additionally, the object's orientation may include data that describes the object's composition, spin speed, or rate of spin. For example, in an embodiment applied to the sport of baseball, the DCS 120 may capture the amount of surface area of contact by the hand of the pitcher and the orientation of the ball in the pitcher's hand. Depending on the application, the DCS 120 may record environmental data such as humidity, temperature, pressure, wind speed, amount of ambient light, sound levels, and the like.

The DCS 120 may utilize a database or file structure suitable to record and manipulate data within the time frames required by the invention. Database may be any type of database, such as relational, hierarchical, object-oriented, or similar data management structures. Database systems are well known and will not be described in detail. However, the data storage may be organized in any suitable manner, including flat files, data tables, lookup tables, or the like. Association of certain data may be accomplished through any data associated technique known and practiced in the art. One skilled in the art will also appreciate that any databases, systems, devices or other components of the system may consist of any combination at a single location or at multiple locations.

The DCS 120 processes the capture data from the ATS 110 to predict the path or trajectory of the moving object. Various algorithms and ballistic equations exist for the calculation and the prediction of the movement of an object through two or three dimensions. Depending on the application, the DCS 120 collects the appropriate data and utilizes the proper algorithm to provide a prediction of the path of the moving object to the marking control system 130. The data output of the DCS 120 is configured to actuate the MCS 130 so that the path of the moving object may be followed in real time.

In various embodiments, the DCS 120 may capture and store multiple instances of tracking the trajectory of a moving object. By storing and processing multiple instances of tracking the object, the DCS 120 can use this data to improve its predictive ability and therefore the MCS's 130 ability to successfully mark the moving object. For example, in the case of baseball, the motion tracking and marking system 100 can be configured to track and capture (i.e., monitor) a pitcher throwing a single pitch multiple times. Because tendencies of a single pitcher or type of pitch may be similar, the data captured during monitoring can be used to improve predicting the trajectory of the baseball when the DCS 120 needs to instruct the MCS 130 to mark the baseball. In other embodiments, the monitoring function can be set up to monitor many different pitches from many different pitchers to build a database of pitch characteristics including the trajectory of each pitch. Although explained in the terms of baseball, this monitoring function may be applied to various sports or other applications.

In some embodiments, the DCS 120 may construct digital representations of areas or "zones" along the general anticipated path of the moving object. The digital construction of the zones facilitates the actuation of the MCS 130. For example, an initial zone may be digitally constructed at the beginning of an object's anticipated trajectory. An ending zone may be constructed at the end of the object's anticipated trajectory. The initial and ending zones may abut each other. When the moving object enters the initial zone, the MCS 130 may be actuated to mark the moving object in a certain manner, for example, with a particular colored light. Other embodiments may track, but not mark the moving object while it is in the initial zone. When the moving object enters the ending zone, the MCS 130 may be actuated to mark the moving object in a manner different than in the initial zone. The number of zones utilized depends on the particular application of system and methods of the invention.

Marking control system (MCS) 130 includes any hardware and/or software suitably configured to mark the surface of the tracked object as the object moves through space as may be needed for the particular application. In general, the MCS 130 receives motion tracking data output from the DCS 120 that enables the MCS 130 to follow an object's movement and mark the object as it moves. The type of mark may vary with the particular application, but in exemplary embodiments, the marking is readable by a human. For example, the marking may be accomplished by focusing light on the moving object. In various embodiments, the focused light is a laser. In other embodiments, the lighting is more diffuse so that the moving object appears to be shaded. The MCS 130 is able to change the type of mark or characteristics of the mark throughout the object's movement through space. In an exemplary embodiment, one, two or more types of marking are used to denote different aspects of the object to the striker.

In various embodiments, the MCS 130 may also comprise additional marking hardware and/or software that is physically coupled to the striker's view so that the striker can view in real time where and how his line of sight matches that of the DCS-informed marking on the object (herein referred to as a "striker marking system" or SMS). For example, the SMS may include a laser sight attached to the head of a striker at or near the same sight line as the striker's eyes. In one embodiment, the SMS may be attached to a helmet. In other embodiments, the SMS is a pair of eyeglasses worn by the striker. In yet other embodiments, the SMS is attached to the implement used to strike the incoming object. As the striker looks at the incoming object, the SMS also marks the incoming object. The striker will see the SMS-informed marking as well as the DCS-informed marking on the object. In an exemplary embodiment, if the SMS-informed marking and the DCS-informed marking meet or are within allowable tolerances for the particular application, the color of the markings may change to a different color or change to some other manner of marking the object. In another embodiment, an audible sound may alert the striker that the SMS marking and the DCS-informed marking have met or are within allowable tolerances for the particular application.

In other embodiments, the SMS is configured to identify and track the features of the striker and relay this information to control ancillary marking hardware and/or software. In these embodiments, the SMS is not physically coupled to the striker. The SMS operates in conjunction with additional motion tracking hardware and/or software to "read" the features of the striker, e.g., the eyes of a striker, capture the movement of the features, and communicate this data to the SMS, which in turn controls the ancillary marking hardware. In an exemplary embodiment, the additional motion tracking hardware and/or software is a high-speed digital video camera coupled to motion tracking software. The data generated by this high-speed digital video camera is communicated to the existing DCS 120, which correlates this data with the data generated by the ATS 110. The DCS 120 may then instruct, or assist in instructing, the SMS to mark the incoming object. The correlated information can be used to determine how close the ancillary laser spot on the incoming object is to the DCS-informed laser marking. In another exemplary embodiment involving the sport of baseball, the high-speed digital camera may be placed at the pitcher's mound or in the pitcher's rubber. The camera is aimed at and "reads" or tracks the facial features of the batter, e.g., the eyes, during the attempt to hit a pitched baseball. The camera communicates this data to the DCS 120. The DCS 120 processes this data and instructs an ancillary laser, part of the SMS, to mark the spot on the baseball that the batter is looking at (assuming the batter is looking at the baseball).

In various embodiments, the SMS is associated with the ATS 110. The ATS 110 may include additional hardware and/or software to incorporate the needed functionality to provide data to the DCS 120. For example, the ATS 110 may incorporate one or more additional camera systems. These subsystems may also be associated with the DCS 120 that in turn is connected to the SMS. In an exemplary embodiment, a pair of eyeglass may include a high speed digital camera as part of the ATS 110. The eyeglass may also include a laser sight as part of the SMS, which is associated with the MCS 130. Both systems are connected to the DCS 120. As an incoming object travels towards the striker, the striker will track the incoming object with his eyes and head. As the eyes and head move to track the object, the high speed digital camera as part of the ATS 110 will track the moving object. The DCS 120 will capture and process this information and provide it to the SMS also on the eyeglasses. The SMS marks the incoming object with a laser focus or other type of appropriate marking so that the striker can see how his eyesight and/or head movement matches the trajectory of the object. At the same time, the DCS 120 is also information the MCS 130 to externally mark the incoming object. When the SMS and MCS 130 markings are within a certain distance (e.g., 0.5 inches of each other), the SMS and MCS 130 will be instructed to change the color of their markings so that they are the same. If during the object's trajectory the SMS and MCS 130 markings separate farther than 0.5 inches, the SMS and MCS 130 will be instructed to change the color of their markings so they are different. This enables a real time assessment of a striker's performance as the strike attempt is happening. Though this embodiment has been explained as applied to a pair of eyeglasses, any suitable application of incorporating the striker's tracking of an object into the external marking provided by the MCS 130 is within the spirit and scope of this invention.

In an exemplary embodiment utilizing a laser and shading technique, the MCS 130 is configured to apply a color scheme of light to illuminate the object as it travels along its trajectory. For example, the MCS 130 may shade the object during a portion of its trajectory, while applying a focused laser light to a specific area of the object. In other embodiments, the MCS 130 may "turn off" and "turn on" the marking technique according to the object's characteristics while moving or according to the object's position along its trajectory. In yet another embodiment, the MCS 130 may employ a strobe technique, as in the case of a laser light, at different frequencies or durations or a strobe light with a wide-angle light beam technique. Other embodiments may utilize reflective dyes or similar material to assist in enhancing brightness and thus the ability to view the object when the object is marked. Additionally, the MCS 130 may provide other cues such as audio signals to signal to the striker the moving object's status.

In an exemplary embodiment, the MCS 130 marks a pitched baseball using a laser and shading technique. The MCS 130 may be located in the home plate. In this case, the home plate may need to be made out of a material that is translucent to the laser frequency but invisible to the naked eye. In the case of training a pitcher, the pitching rubber plate may accommodate the MCS 130. As the baseball travels through its trajectory, the MCS 130 marks the baseball with different colors of light. The first color would mark the seams of the baseball and the second color would mark the cover of the baseball. The opposing color scheme enables better identification of the spin of the baseball as it travels along its trajectory. In variations of this exemplary embodiment, the shading of the cover of the baseball may change colors depending on the position of the ball in relation to the batter. For example, the MCS 130 may shade the baseball with a red color as it leaves the hand of the pitcher. As the ball travels along its trajectory, the color of the ball may change gradually or abruptly to a different color to indicate to the batter when an attempt to hit the ball is appropriate. The color may not change unless the ball becomes a hittable pitch. For example, if the thrown pitch is predicted never to enter the strike zone of a batter, the color may not change, which indicates to the batter to not swing at the pitch. In other embodiments, the color shading may indicate that the pitched ball is a good ball to swing at (i.e., a hittable pitch) even though it may not result in a strike being called. Furthermore, the MCS 130 may utilize a strobe technique to identify the spin of the baseball.

Even though this embodiment of the MCS 130 has been described as applicable to sports and specifically the sport of baseball, one ordinarily skilled in the art will appreciate that the motion tracking and marking system is applicable to various applications, including any sport involving striking an object such as softball, tennis, hockey, soccer, football, cricket, archery, basketball, shooting. The invention should not be read as to be limited to sports. Any application where a need to mark a moving object is within the spirit and scope this invention.

Figure 2:
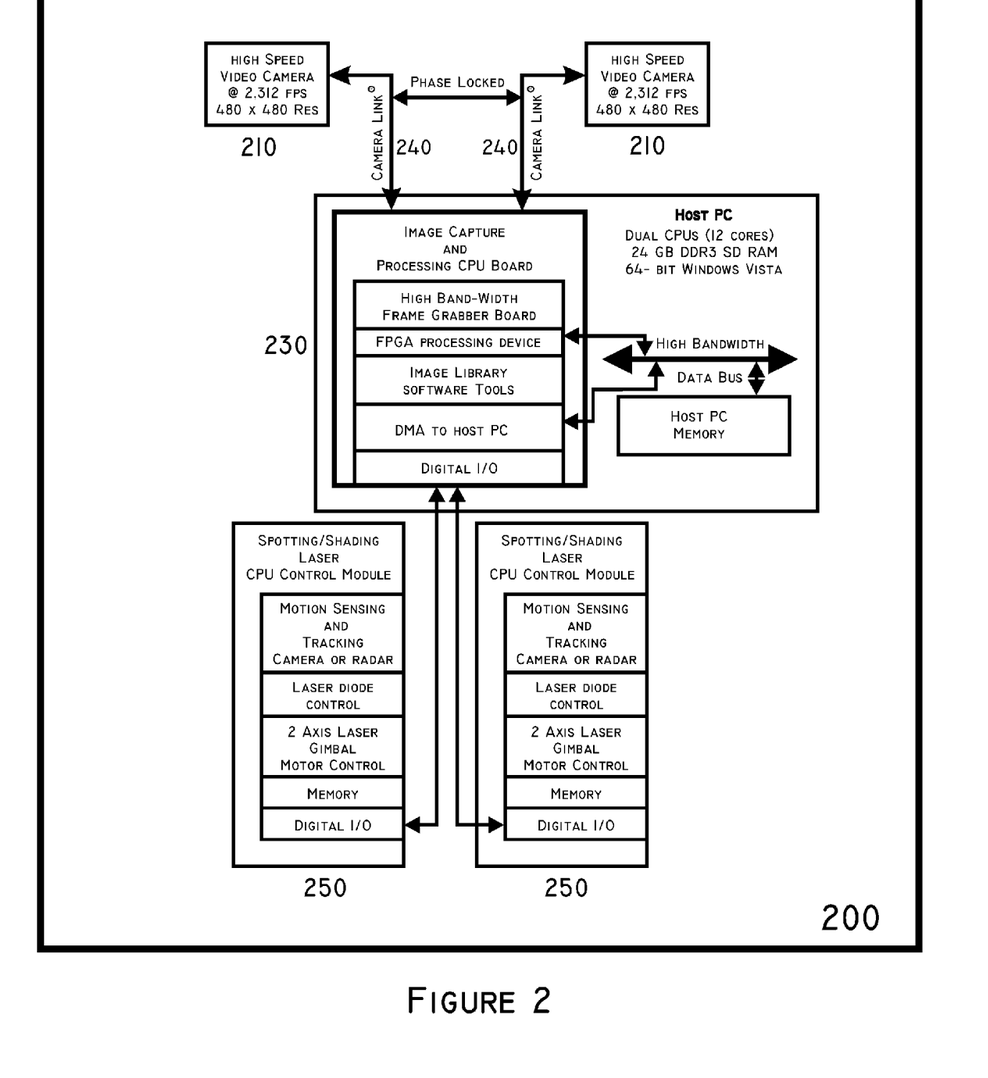
FIG. 2 illustrates a motion tracking and marking system as applied to the sport of baseball.

FIG. 2 shows an exemplary embodiment of the motion tracking and marking system 200 applied to the sport of baseball to improve a batter's, umpire's, or pitcher's performance. In the case of a batter, the system assists the batter to identify whether the pitch may be a strike, ball, or a hittable pitch. In the case of an umpire, the system assists the umpire's early recognition of a pitched ball that may or may not enter the strike zone. In the case of a pitcher, the system provides real time feedback of their pitched balls and whether a particular pitch entered or passed through a hittability zone or the strike zone. The ATS 210 comprises two high speed high-definition digital cameras. In this exemplary embodiment, the cameras sample at 2,312 frames per second with a 480×480 pixel resolution. However, the specific type of camera will depend on the specific application but will need to have a suitable sample rate or frame rate and pixel resolution so that the images produced are of high enough quality to complete the specific analysis. One camera is placed along the x-y axis of, preferably perpendicular to, the anticipated path of the baseball. The second camera is placed along the z-axis of, preferably parallel to, the anticipated path of the baseball. In this exemplary embodiment, the cameras are phase locked and communicate with the DCS 230 through Camera Link®. Perfect perpendicular and parallel placement is not necessary. Camera placement should be configured so that the complete path of the baseball may be digitally captured and pixelated. Furthermore, more cameras may be added depending on the specific application should they be needed. Additionally, the camera system may be fixed or possess the ability to vary position depending on the specific application. The ATS 210 captures the in-flight data of a pitched baseball and communicates the captured data in real time to the DCS 230 over communication network 240. The DCS 230 according to well-known algorithms governing the flight of baseballs processes the captured data. One well-known system that tracks pitched baseballs and captures digital information regarding the pitch is Sportvision's® PITCHf/x system currently in use for Major League Baseball®.

The DCS 230 processes data captured from the trajectory of the pitched baseball and communicates the processed data to the MCS 250. The data captured includes the baseball's speed, trajectory, spin and spin speed. In this exemplary embodiment, the DCS 230 comprises a personal computer configured with a high band-width frame grabber board, an FPGA processing device, an image software library, a DMA to the personal computer and any other necessary components to support the board and personal computer such as core processors, memory and a data bus. The DCS 230 communicates with the MCS 250 through digital input/output. The DCS 230 will need the speed and performance necessary to process the amount of information generated by the ATS 210.

The MCS 250 includes two spotting/shading lasers. In this exemplary embodiment, the spotting/shading lasers include a motion sensing and tracking camera or radar, a laser diode control, a 2-axis laser gimbal motor control, memory and digital input/output. The MCS 250 will need the speed and performance necessary to track and mark the ball at the various speeds the ball may be thrown. The spotting/shading lasers are placed inside a home plate enclosure that is unobtrusive to the batter and the umpire. Optionally, the MCS 250 includes the ability to compensate for a batter's individual strike zone when standing at the plate. The MCS 250 uses the predicted trajectory data as calculated from the ATS 210 and DCS 230 to instruct the spot and shading lasers to mark the baseball in real time on its flight to the plate. In this embodiment, the shading lasers indicate according to color whether the predicted path of the baseball will enter the strike zone. For example, green indicates that a swing should be attempted, while red shading indicates the predicted path of the ball will not result in a hittable pitch or a called strike. Furthermore, only part of the baseball may be shaded if only part of the pitched ball will enter the strike zone. The spot laser directly marks or strobes the laser light on the ball so that the batter may better view the spin of the seams on the ball. The MCS 250 may be configured to mark and un-mark the baseball at different points in its flight. For example, the laser light may mark the ball immediately upon release from the pitcher's hand. The shading lasers then mark the ball at some other predetermined point in the predicted flight path of the ball.

As stated above, an optional feature of the system is to construct digital zones along the anticipated path of the object. As applied to the sport of baseball as outlined in FIG. 3, the system digitally constructs three zones along the anticipated path of the baseball: the predictive zone 310, the hit-ability zone 320, and the strike zone 330. The predictive zone begins at the point of release or far enough in front of the pitcher's release point of the baseball for the analysis of the ball's trajectory to predict its path to home plate. In this embodiment, the length of the predictive zone 310 is about 55.5 feet measured from the pitcher's rubber to about 5 feet in front of home plate. Other embodiments may vary the length, height and width of this zone. The hit-ability zone 320 abuts the predictive zone. Its length is about 5 feet measured from the end of the predictive zone to the front of the strike zone. The third zone, the strike zone 330, is directly over the home plate.

Figure 3:
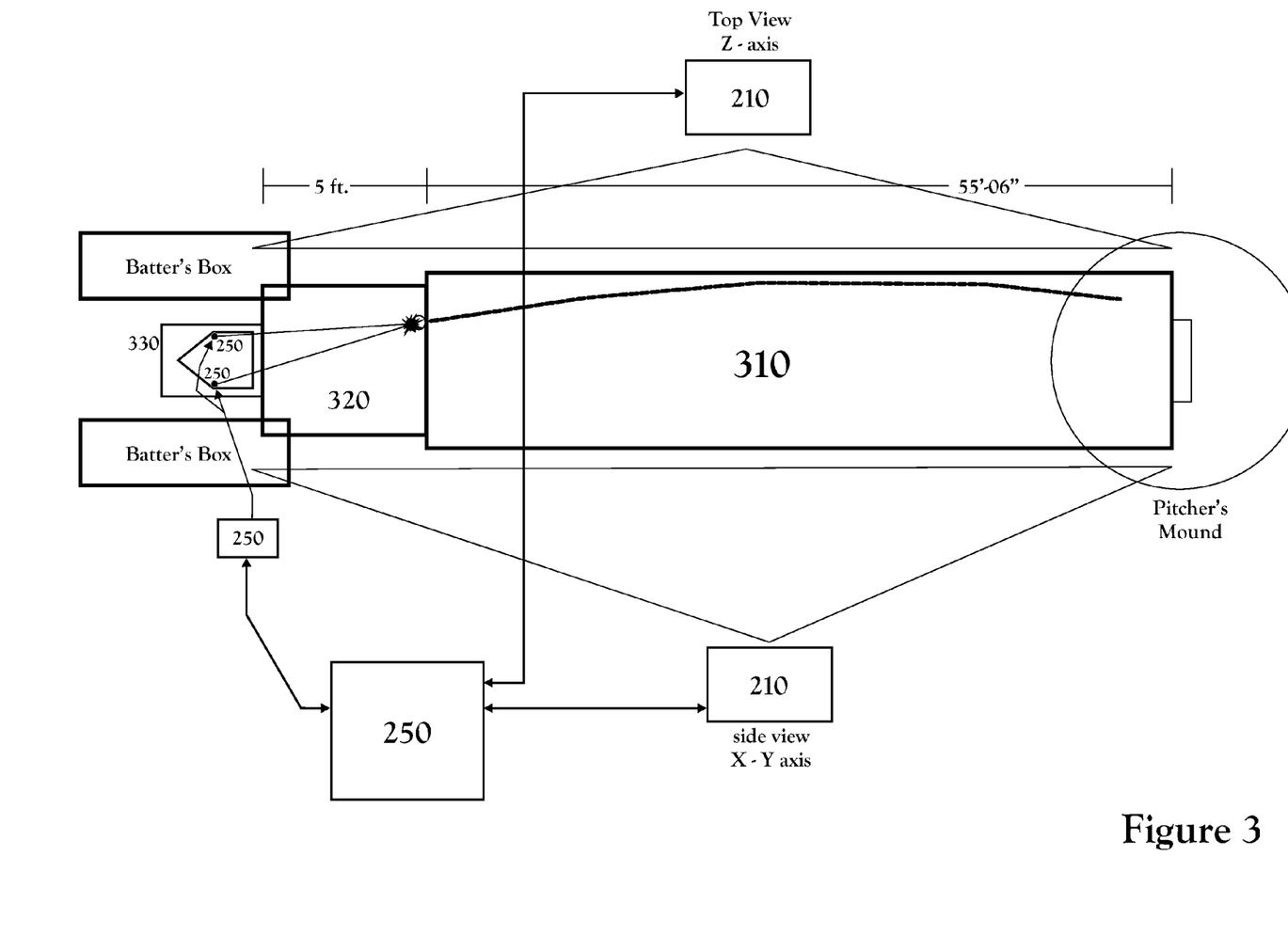
FIG. 3 illustrates the use of digital zones as applied to the sport of baseball.

When the ball leaves the pitcher's hand, the ball enters the predictive zone. In this embodiment, during the ball's flight in the predictive zone, the ATS 210 and the DCS 230 work in conjunction as described above to capture and analyze the pitched ball's trajectory and characteristics. Once a predicted trajectory may be calculated, the MCS 250 is instructed by the DCS 230 to mark the ball according to whether the pitch is predicted to enter the strike zone or not. Depending on the analysis, the ball may be shaded as early as its flight in the predictive zone, but no later than entry into the hit-ability zone. If the pitch is predicted to enter the strike zone, the shade laser marks the ball with the color green. If the pitch is not predicted to enter the strike zone, the shade laser marks the ball with the color red. As the ball approaches the hit-ability zone, the ball may become shaded in two different colors depending on the predicted path through the hit-ability zone. For example, if part of the ball is predicted to enter the hit-ability zone, that part may be shaded green. The part of the ball not predicted to enter the hit-ability zone would be shaded red. Additionally, the spot laser would indicate the most opportune spot to hit the ball. If the whole ball is in the hit-ability zone, the whole ball could be shaded green. Or on the other hand, if the ball is out of the hit-ability zone, the ball could be shaded red or turn to a different color such as blue.

An optional feature of the motion tracking and marking system may be hardware and/or software configured to include an instant reply capability that includes the ability to view the marking that was performed upon the object. Various embodiments enable the instant reply capability to be used in conjunction with the actions taken by the striker in reaction to the shading received for a particular object. In an exemplary embodiment, the instant reply capability is a video display system.

The instant replay capability may be further configured to identify the eyes, face, arms, torso, and/or legs of the striker or striking implement during the attempt to strike the object. For example, the image replayed may be digitally enhanced to outline the part(s) of the body when reviewing the replay of the attempt. In an exemplary embodiment, the striker's eyes and face is outlined on a video display system. Other digital elements may be incorporated within the reply such as sight lines that correlate the direction of the striker eyes when viewing the approaching object. For example, a line may be digitally drawn from the eye to the marked object throughout the object's trajectory. Another feature may include the ability to compile and output reports of the data recorded and the instructions sent to the MCS system.

Figure 4:
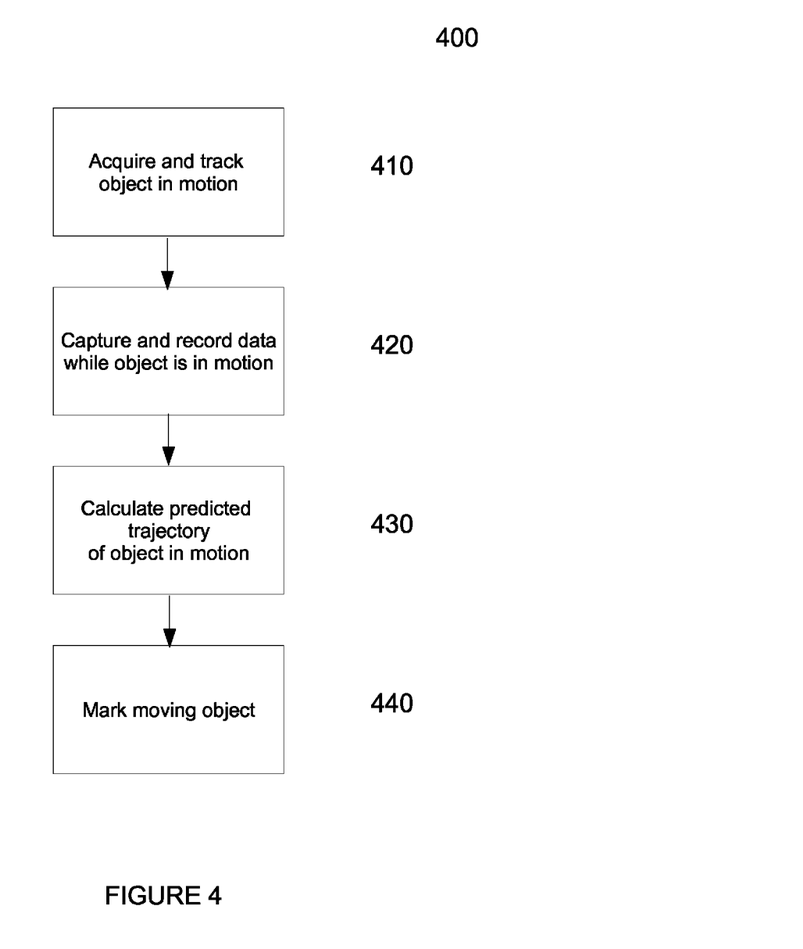
FIG. 4 illustrates an exemplary method of a motion tracking and marking system.

FIG. 4 illustrates, in block format, a method of tracking a moving object and marking the object while moving 400. In this method, an object in motion is acquired and tracked in a two or three dimensional space 410. Data is captured and recorded while the object is moving 420. The type of data captured depends upon the type of tracking system used, the particular object placed in motion, and the particular application. For example, in one embodiment, the method tracks the path of a baseball pitched to a batter. In another embodiment, the method tracks the movement of a kicked soccer ball. The projected trajectory of the object is calculated 430. Based on this projected calculation, the moving object is marked in real time by a system external to the object 440. The marking facilitates the ability of one to view and in some cases strike the object. Optionally, a method of tracking a moving object and marking the object while moving may include marking the object from the point of view of the striker.

Although the above description may contain specific details, they should not be construed as limiting the claims in any way. Other configurations of the described embodiments of the invention are part of the scope of this invention. The descriptions and embodiments are not intended to be an exhaustive or to limit the invention to the precise forms disclosed. Accordingly, the appended claims and their legal equivalents should only define the invention, rather than any specific examples given.

What is claimed is:

1. A system for tracking the motion of an object and marking the object while moving comprising:
    a first system, the first system having a processor, configured to track a trajectory of an object in motion;
    a second system, the second system having a processor, configured to receive data from the first system and calculate an orientation of the object and a position of the object within a space as the object moves through the trajectory;
    a third system, the third system having a processor, configured to mark the surface of the object in motion according to the position of the object within the space as calculated by the second system, the mark comprising a visual indicator.

2. The system of claim 1, wherein the third system comprises a spot laser.

3. The system of claim 1, wherein the third system comprises a shade laser.

4. The system of claim 1, further comprising an audio system.

5. The system of claim 1, wherein the first system comprises at least one high speed digital camera.

6. The system of claim 1, wherein the first, second and third systems are coupled together by a communication network.

7. The system of claim 6, wherein the communication network is wireless.

8. The system of claim 1, wherein the second system constructs at least one digital zone along an anticipated trajectory of the object in motion.

9. The system of claim 8, wherein the third system is instructed to mark the object motion based on a position within at least one digital zone.

10. The system of claim 1, wherein the object in motion is selected from the group of softball, tennis ball, hockey puck, soccer ball, football, cricket ball, arrow, basketball, clay pigeon, bullet.

11. The system of claim 1, further comprising a fourth system configured to replay on a display the marking that was performed upon the object in motion.

12. The system of claim 1, further comprising a fourth system configured to mark the surface of the object in motion according to a striker's line of sight.

13. The system of claim 12, wherein the fourth system comprises eyeglasses.

14. The system of claim 13, wherein the eyeglass comprise a high speed digital camera and a spot laser.

15. A system for tracking the motion of a baseball and mark the pitched baseball while moving comprising:
    a high speed digital camera situated along an anticipated trajectory of a baseball configured to track an actual trajectory of the baseball when put into motion;
    a first processor coupled to the high speed digital camera configured to control the high speed digital camera and to calculate an orientation of the baseball and a position of the baseball as the baseball moves through the actual trajectory;
    a second processor in communication with the first processor, the second processor coupled to a plurality of laser cameras, wherein the first processor instructs the second processor to operate the plurality of laser cameras to mark the surface of the baseball according to the position of the baseball as calculated by the first processor.

16. The system of claim 15, wherein one of the plurality of laser cameras is instructed to mark a spot on the baseball.

17. The system of claim 15, wherein one of the plurality of laser cameras is instructed to shade the baseball.

18. The system of claim 17, wherein the color of the shade of the baseball is varied according to the position of the baseball within its actual trajectory.

19. The system of claim 15, wherein at least one of the plurality of laser cameras are coupled to a plate, the plate being situated within the anticipated trajectory of the baseball.

20. A method for tracking the motion of an object and marking the surface of the object while the object is moving, the steps comprising:
    tracking a trajectory of an object in motion;
    calculating an orientation of the object and a position of the object based on the tracking;
    marking the surface of the object in motion as calculated as the object travels through the trajectory, the marking comprising a visual indicator.

21. The method of claim 20, wherein the visual indicator is a laser.

22. The method of claim 20, wherein the visual indicator is varied according to a position of the object along its actual trajectory.

23. The method of claim 20, wherein the object in motion is a baseball.

24. The method of claim 20, further comprising the step of applying a second marking to the object in motion, the second marking associated with a striker's line of sight.

* * * * *